(12) United States Patent
Gates et al.

(10) Patent No.: US 7,246,936 B2
(45) Date of Patent: Jul. 24, 2007

(54) DYNAMIC MIXER SCREW TIP

(75) Inventors: Thomas A. Gates, Parma, MI (US); James N. Valentine, Rives Junction, MI (US); David H. Steele, Jackson, MI (US); Steven H. Bowens, West Chester, PA (US); Donn L. Briskie, Jackson, MI (US)

(73) Assignee: Certainteed Corp., Valley Forge, PA (US)

( * ) Notice: Subject to any disclaimer, the term of this patent is extended or adjusted under 35 U.S.C. 154(b) by 283 days.

(21) Appl. No.: 10/860,899

(22) Filed: Jun. 4, 2004

(65) Prior Publication Data

US 2005/0270894 A1 Dec. 8, 2005

(51) Int. Cl.
*B29C 47/64* (2006.01)

(52) U.S. Cl. ...................................................... 366/82

(58) Field of Classification Search ............... 366/79, 366/81–85, 301, 318–324; 425/204, 208, 425/209
See application file for complete search history.

(56) References Cited

U.S. PATENT DOCUMENTS

| | | | | |
|---|---|---|---|---|
| 2,817,876 A | * | 12/1957 | Gandelli et al. | 366/82 |
| 3,730,492 A | | 5/1973 | Maddock | |
| 4,152,076 A | | 5/1979 | Driskill | |
| 4,408,887 A | * | 10/1983 | Yamaoka | 366/75 |
| 4,415,268 A | | 11/1983 | Brinkmann et al. | |
| 4,447,156 A | * | 5/1984 | Csongor | 366/80 |
| 4,697,928 A | * | 10/1987 | Csongor | 366/80 |
| 4,749,279 A | * | 6/1988 | Csongor | 366/80 |
| 4,863,364 A | | 9/1989 | Grimminger et al. | |
| 4,875,847 A | | 10/1989 | Wenger et al. | |
| 4,940,329 A | * | 7/1990 | Dienst | 366/75 |
| 5,000,900 A | | 3/1991 | Baumgartner | |
| 5,044,757 A | * | 9/1991 | Dienst | 366/76.6 |
| 5,178,458 A | | 1/1993 | Hsu | |
| 5,320,796 A | * | 6/1994 | Harashima et al. | 264/349 |
| 5,370,456 A | * | 12/1994 | Yamaoka | 366/80 |
| 5,630,968 A | * | 5/1997 | Wang et al. | 264/53 |
| 5,851,065 A | * | 12/1998 | Ikeda et al. | 366/76.6 |
| 5,873,654 A | | 2/1999 | Lu | |

(Continued)

FOREIGN PATENT DOCUMENTS

DE 3150757 A1 * 7/1982

(Continued)

OTHER PUBLICATIONS http://www.madisongroup.com/Products/Mixers/DDSM/ddsm.html, "Dispersive/Distributive Static Mixer" (DDSM), Jun. 11, 2003.

(Continued)

*Primary Examiner*—Charles E. Cooley
(74) *Attorney, Agent, or Firm*—Duane Morris LLP

(57) ABSTRACT

The present invention includes a screw tip for an extruder screw for effecting mixing in an extruder. The screw tip has a shaft portion and at least one mixing element ring connected to the shaft portion, or a mixing element having an aperture therethrough, or both. The mixing element may have two legs connected by a top portion with the aperture between the two legs to allow flow of extrudate therethrough.

15 Claims, 19 Drawing Sheets

U.S. PATENT DOCUMENTS

| | | | |
|---|---|---|---|
| 5,902,529 A * | 5/1999 | Ishikawa et al. | 264/51 |
| 6,017,996 A * | 1/2000 | Hamada et al. | 524/588 |
| 6,102,560 A | 8/2000 | Grimm et al. | |
| 6,241,375 B1 * | 6/2001 | Wang | 366/82 |
| 6,254,266 B1 * | 7/2001 | Barr et al. | 366/82 |
| 6,958,128 B2 * | 10/2005 | Gates et al. | 264/211.21 |
| 2005/0270894 A1* | 12/2005 | Gates et al. | 366/82 |

FOREIGN PATENT DOCUMENTS

| | | |
|---|---|---|
| DE | 100 00 938 A1 | 7/2000 |
| DE | 10000938 A1 * | 7/2000 |
| JP | 62-148233 * | 7/1987 |

OTHER PUBLICATIONS

Medical Device & Diagnostic Industry Magazine, Medical Plastics and Biomaterials "In the Mix: Continuous Compounding Using Twin-Screw Extruders," http://www.devicelink.com/mddi/archive/00/04/010.html, visited Jun. 3, 2004, copyright 2000, month and date unknown.

"The Madison Group," brochure, the Madison Group: PPRC, Madison, WI, 2000.

"Koch-Glitsch," brochure, Koch-Glitsch, Inc., Wichita, KS, 2000.

International Search Report in PCT/US05/18969 dated Aug. 15, 2006.

* cited by examiner

DYNAMIC MIXER SCREW TIP

FIELD OF THE INVENTION

The present invention relates to extrusion devices, and more particularly to screw tips for use in extruders.

BACKGROUND OF THE INVENTION

Extruders are commonly used in order to form various types of products (e.g., blown film, pipe, coated paper, plastic filaments, carpet fiber, and vinyl siding) from thermoplastic materials, such as polyvinylchloride, polyethylene or polypropylene, for example. The extruder carries out an extrusion process whereby a solid plastic (or resin), which is often in the form of beads, pellet or powder form, is compressed, melted (plasticized) and mixed while being carried along by a feedscrew, after being fed into a barrel chamber which houses the feedscrew. Ultimately, a resin, which is expectantly homogenized, is forced out of the extruder through a die, which, depending on its design and other downstream equipment, forms the resin into the particular desired shape.

Depending on the application, the plastic material is often compounded with other chemicals prior to formation of the plastic material into pellets or beads. These chemicals, which may vary in amount, include, for example, stabilizers, lubricants, dyes or other colorants, plasticizers, fillers, and other additives which may add or enhance certain desirable product properties. In order to obtain the desired properties throughout the final product, it is important that the additives, such as those listed, are evenly distributed and dispersed in the extrudate as it enters the die.

Referring to FIG. 1, a prior art single screw extruder machine 5 is shown comprising a barrel 12, a feedscrew 14, an adapter 16, a die 18, and a hopper 19. The barrel 12 is typically a thick-walled steel chamber that is machined to have a tight fit with the feedscrews 14. The feedscrews 14, which are usually the only moving parts in the extruder, generally include at least three defined sections: a feed zone, a compression zone, and a metering zone, each zone varying, for example, in channel depth, distance between flights, and flight patterns. The feed zone takes resin from the hopper 19 and conveys it along the initial part of the barrel chamber. During this conveyance, the resin pellets encounter friction from the feedscrew surfaces, the barrel surface and from other pellets, resulting in heat which begins to melt the resin. In the compression zone, the channel depth between screw flights usually diminishes resulting in the pressurization of the melting resin and hopefully the completion of the melting process. The metering zone generally serves to further mix the molten resin, hopefully resulting in a homogenized resin with a uniform temperature.

The feedscrew 14 typically has a smooth conical tip, which is enclosed within the adapter 16. The adapter 16 serves as a connection between the barrel 12 and the die 18. It often houses a breaker plate (which breaks the helical flow of the molten resin into a linear flow) and a screen pack (which filters out foreign particles).

Generally, there are two important types of mixing that the screws effectuate in an extruder in order to reduce the non-uniformity of the material or materials being extruded. These two types of mixing, which basically serve to induce relative physical motion in the ingredients of the extrudate, are distributive mixing and dispersive mixing. The combination of both dispersive and distributive mixing will achieve a more uniform overall mixture.

Distributive mixing increases the randomness of the spatial distribution of particles without reducing the size of the particles. It is effectuated by a continuous reorientation of the material being mixed.

Dispersive mixing serves to reduce the size of cohesive particles as well as randomizing their positions. In extrusion processes, dispersive mixing is usually more important than distributive mixing. This is especially true, for example, in the extrusion of compounds which contain colorant pigment agglomerates, which must be uniformly mixed into the extrudate. In dispersive mixing, solid components, such as agglomerates, or high viscosity droplets, are exposed to sufficiently high stresses to cause them to exceed their yield stress, thus causing the agglomerates or droplets to be broken down into smaller pieces. Depending upon the type of material being extruded, including the size, shape, and chemical bonding, varying amounts of stress will be required to break up these materials. The stress which breaks up the agglomerate may either be shear stress or elongational stress. Generally, elongational stress, which is generated by elongational flow or stretching, is more efficient in effectuating dispersion of the material than shear stress, which is caused by the sliding of the material across itself.

In order to enhance the distributive and dispersive mixing in extruders, extruder screws having numerous variations in design have been employed. Extruder screws usually have a standard screw section near the material input hopper, and one or more specially designed sections to enhance distributive and dispersive mixing. To enhance distributive mixing, for example, distributive mixing elements such as pins placed between screw flights, or channels which divide the polymer flow into many narrow channels which are combined and re-divided, are employed. These types of elements generally do not provide regions of high stress and thus serve mainly to spatially redistribute material.

In order to enhance dispersive mixing, i.e., to break up and disperse the agglomerates, screws are employed which have high shear stress or elongational stress regions. For example, screws may be used having a fluted or splined mixing section, in which one or more barrier flights or blister rings are placed along the screw so that the material has to flow over the barriers.

The above described distributive and dispersive mixing elements or regions are typically located at one or more areas on the screw, and thus the mixing is performed in the barrel of the screw extruder. Little, if any, mixing typically occurs in the area of the adapter, which typically encloses the screw tip. As such, the adapter is a location where stagnation of the molten resin may occur potentially resulting in incomplete mixing, heat gradients, and therefore decomposition, degradation or burning of the material, as well as a generation of excessive head pressure, which limits output.

What is desired is an improved screw tip for extruders.

SUMMARY OF THE INVENTION

According to one aspect of the present invention, a screw tip for an extruder screw for effecting mixing of an extrudate in an extruder is disclosed comprising a shaft portion, and at least one mixing element ring connected to the shaft portion.

According to another aspect of the invention, twin screw extruder is disclosed comprising two interacting screw tips, each screw tip comprising a shaft portion, at least one mixing element ring removably connected to the shaft portion, and at least one separation ring removably connected to the shaft portion. The at least one mixing element ring of each screw tip is adjacent to a separation ring of the adjacent screw tip.

According to a further aspect of the invention, a screw tip for an extruder screw for effecting mixing of an extrudate in an extruder is disclosed comprising a shaft portion, and a plurality of mixing elements protruding from the shaft portion and having an aperture therein for allowing the extrudate to pass through.

According to another aspect of the invention, an extrusion process for extruding flowable polymeric material is disclosed comprising providing a screw tip having a plurality of mixing elements, each mixing element including an aperture therein for allowing the polymeric material to pass through, and rotating the screw tip, whereby the polymeric material is fed through the apertures of the mixing elements.

DETAILED DESCRIPTION

Figure 1:
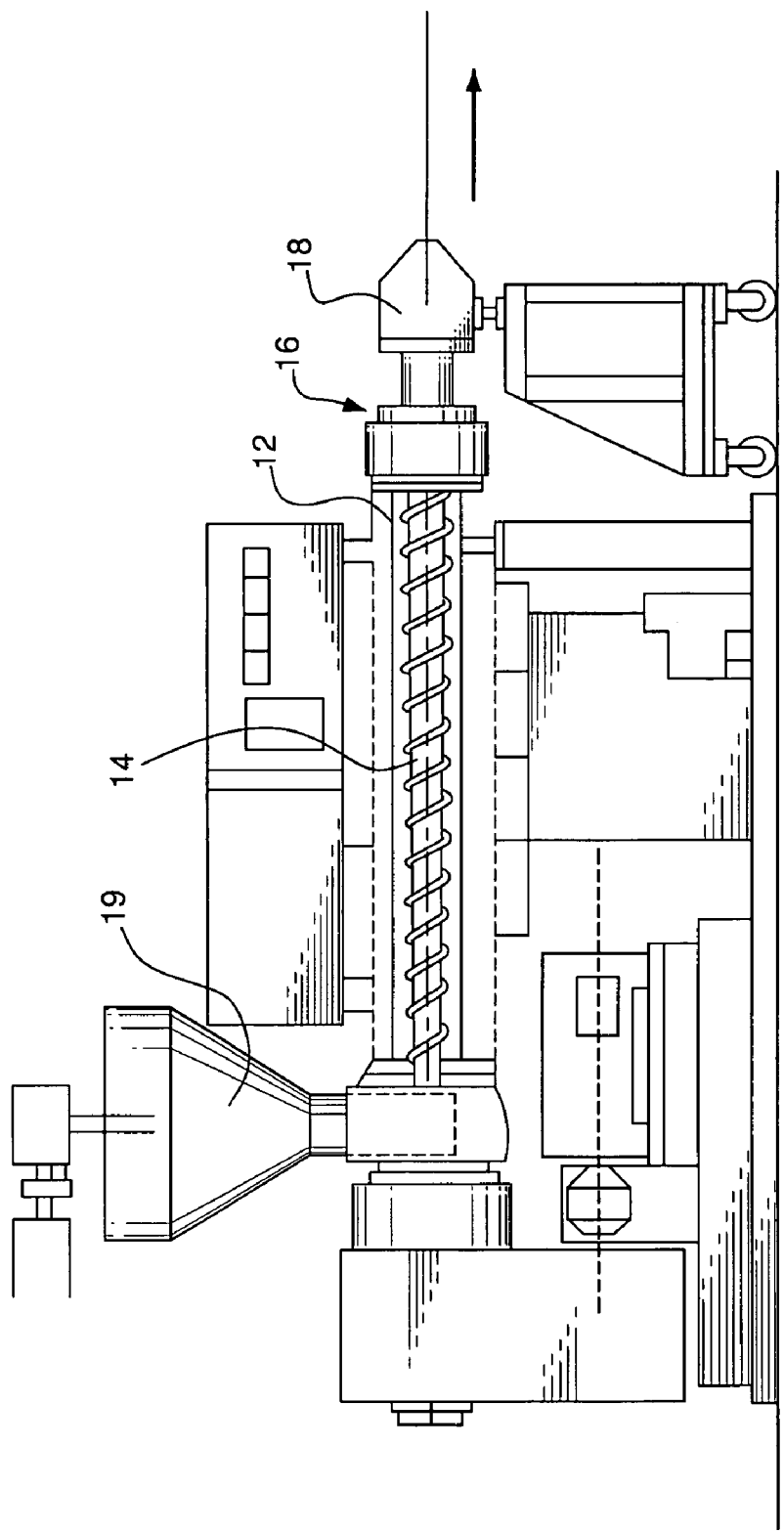
FIG. 1 is a side elevational view of a prior art extruder.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 2:
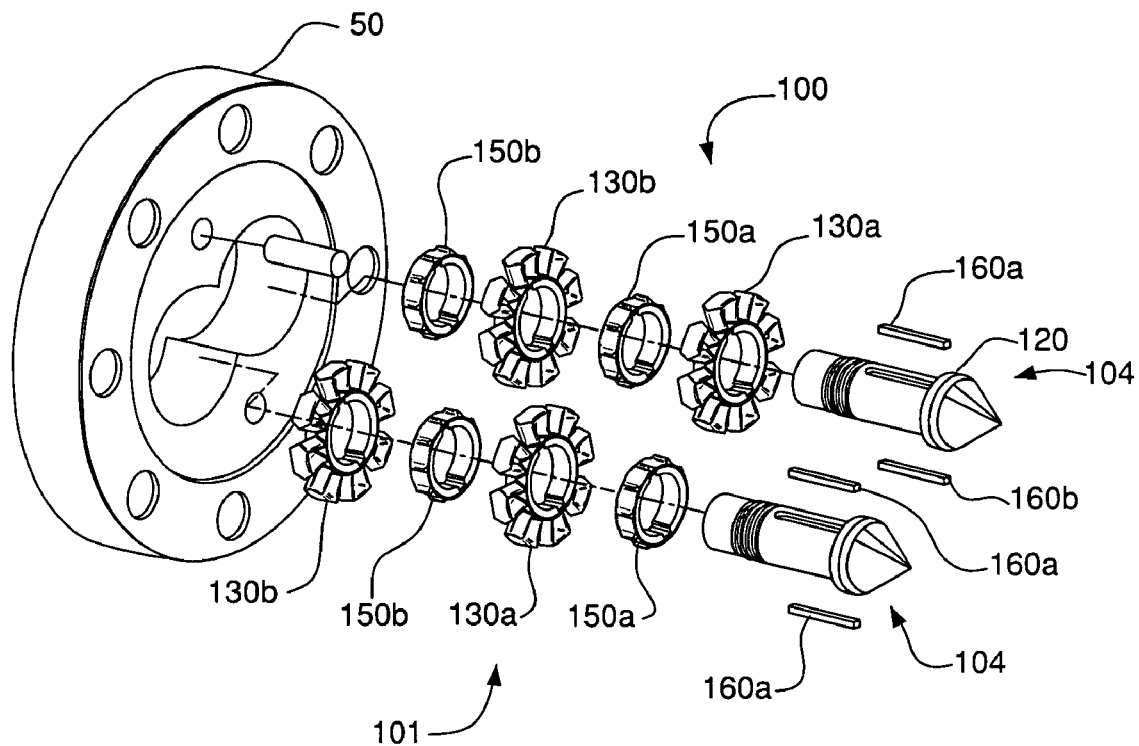
FIG. 2 is an exploded view of extruder screw tips in accordance with an exemplary embodiment of the invention shown in conjunction with a die adaptor plate.
Figure 3:
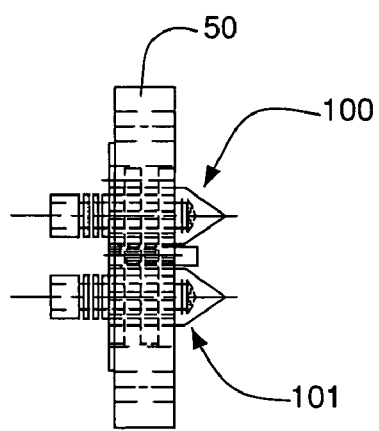
FIG. 3 is a cross-sectional side elevation view of the extruder tips and die adaptor plate of FIG. 2.
Figure 4:
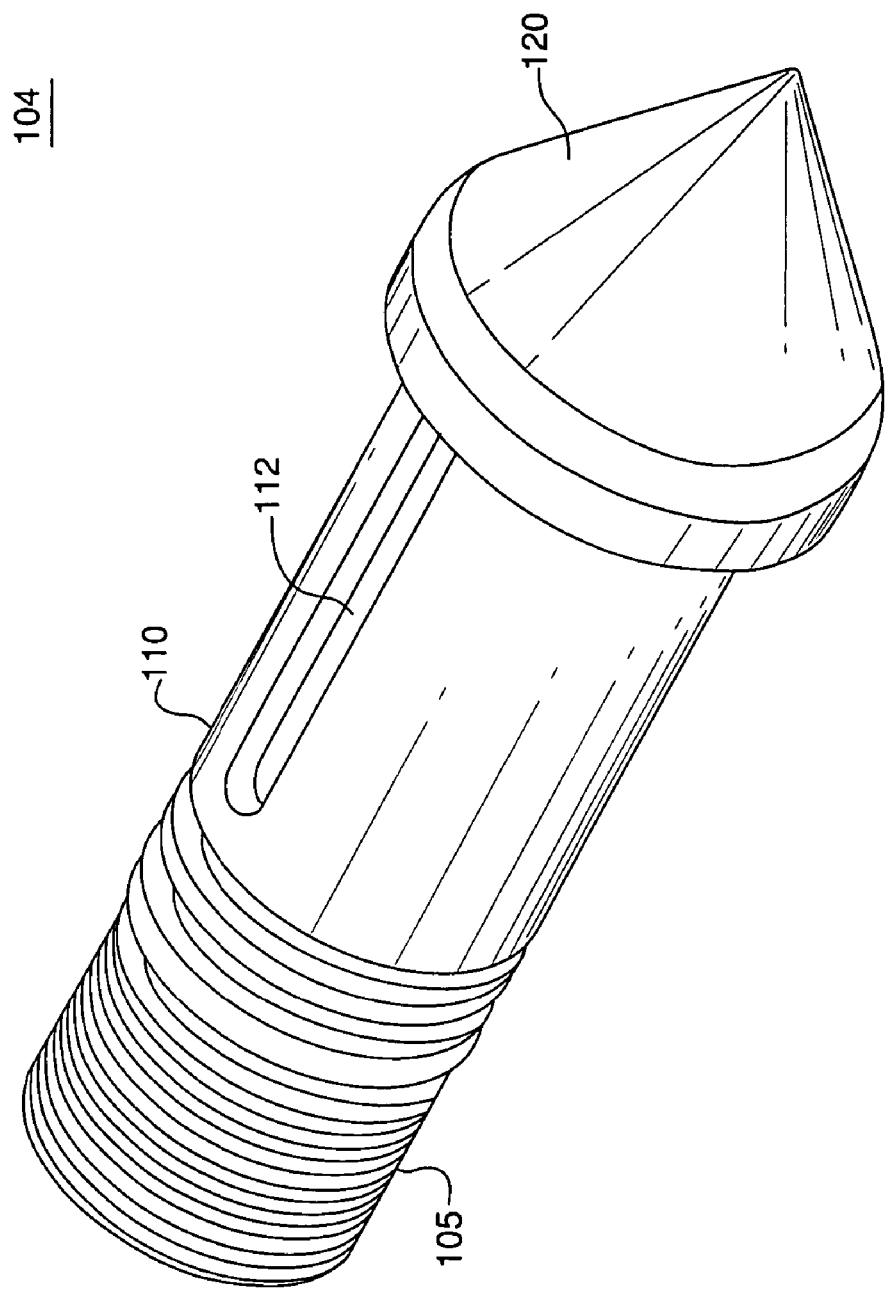
FIG. 4 is an isometric view of an elongated portion of the screw tips of FIG. 2.

Referring to FIG. 2, an exploded view of exemplary screw tips 100, 101 for a twin screw extruder are shown comprising an elongated portion 104, two mixing element rings 130a, 130b, two separation rings 150a, 150b, and two locking keys 160a, 160b. The elongated portion 104 includes an attachment portion 105, a shaft portion 110, and a conical tip portion 120. In FIGS. 2-3, the screw tips are shown in conjunction with a die adaptor plate 50 of a twin screw extruder. Referring to FIG. 4, the attachment portion 105 preferably includes threads 106 for allowing coaxial attachment to a complimentary reverse-threaded screw (not shown). Alternatively, the screw tip may be integral with a screw and therefore lack an attachment portion. Although shown as would be employed in a twin screw extruder, a single screw tip 100 or 101 may be employed in extruders having a single screw. In addition, more than two screws, and thus screw tips, could be employed without departing from the scope of the invention. Further, although described herein with respect to flowable polymeric materials, the screw tips of the present invention may be used in various applications, including, for example, in extruders used in processing foodstuffs.

As shown best in FIG. 4, the shaft portion 110 is a cylindrically shaped rod. Preferably, shaft portion 110 includes two locking recesses 112 (only one shown). The recesses 112 are preferably 180 degrees from one another and extend substantially the length of the shaft portion 110. The recesses 112 are sized to snugly receive a respective locking key 160a, 160b (see FIGS. 2 and 6). The shaft portion 110, upon which the rings are concentrically situated, as well as the recesses 112 and locking keys 160a, 160b, may vary in length, the length increasing with an increase in the number of rings employed on the screw tip.

The tip portion 120 is preferably conical. The angle of the tip portion preferably corresponds to the angle of the inside surface of the adaptor of the extruder. The tip portion 120 preferably includes shaft attachment means, such as threads (now shown), for attachment and separation from the shaft portion 110. Alternatively, the tip portion 120 and the shaft portion 110 may be formed from a single piece of material.

Figure 12:
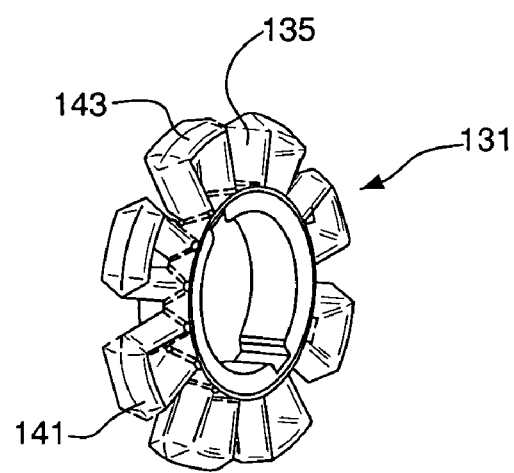
FIG. 12 is an isometric view of another exemplary mixing element ring.
Figure 13:
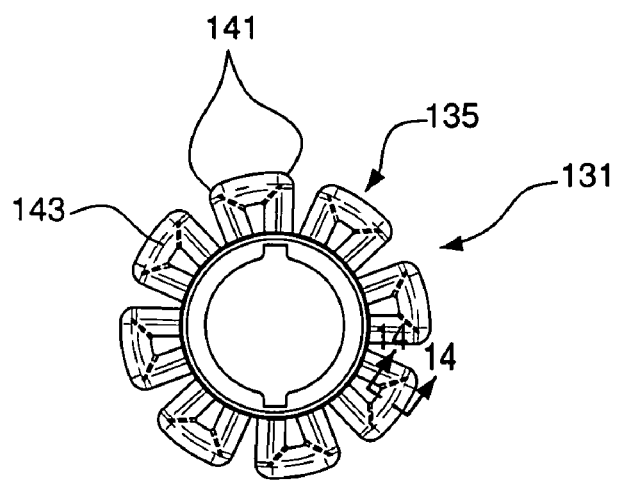
FIG. 13 is a front view of the mixing element ring of FIG. 12.
Figure 14:
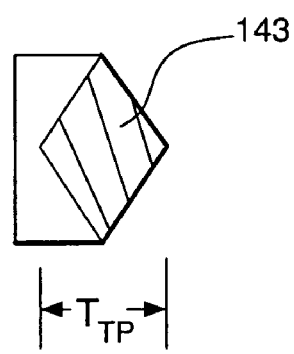
FIG. 14 is a cross-section view taken along line 14-14 of FIG. 13.

Referring to FIGS. 7-11, the mixing element rings 130a, 130b include at least one mixing element 134 and cylindrical ring 136. Preferably, an inside surface 138 of the cylindrical ring 136 includes two locking depressions 135, 137, which are sized and shaped to snugly receive a locking key 160a, 160b. Preferably the locking depressions 135, 137 are situated 180 degrees from one another, which corresponds to the spacing of the two locking recesses 112 of the shaft portion 110. The mixing element rings preferably include a plurality of mixing elements 134, which are preferably aligned with one another around a circumference of the cylindrical ring 136. Preferably the mixing element ring 130a, 130b has eight mixing elements 134 aligned around the circumference of the cylindrical ring 136, but alternatively may have more or less than eight mixing elements. Also, preferably, the mixing elements 134 include an aperture 139. The mixing elements 134 and respective apertures 139 aid in distributive and/or dispersive mixing. In the exemplary embodiment shown in FIGS. 2 and 7-11, the mixing elements comprise two legs 140, which may be diamond-shaped, as shown, and a flat top portion 142, which is attached to the two legs 140. As shown in FIGS. 12-14, an alternative design for a mixing element ring 131 is shown having a mixing element 135, wherein the top portion 143 of the mixing element 135 is triangularly shaped rather than flat. Other configurations or designs of the mixing elements may also be employed without departing from the scope of the invention.

Although the screw tips 100, 101 are shown in FIGS. 2-3 having two mixing element rings 130a, 130b, the screw tip 100 may have one mixing element ring or more than two mixing element rings. As stated previously, the shaft portion 110 can be modified in length to accommodate any number of rings (mixing element rings and/or separation rings).

Figure 15:
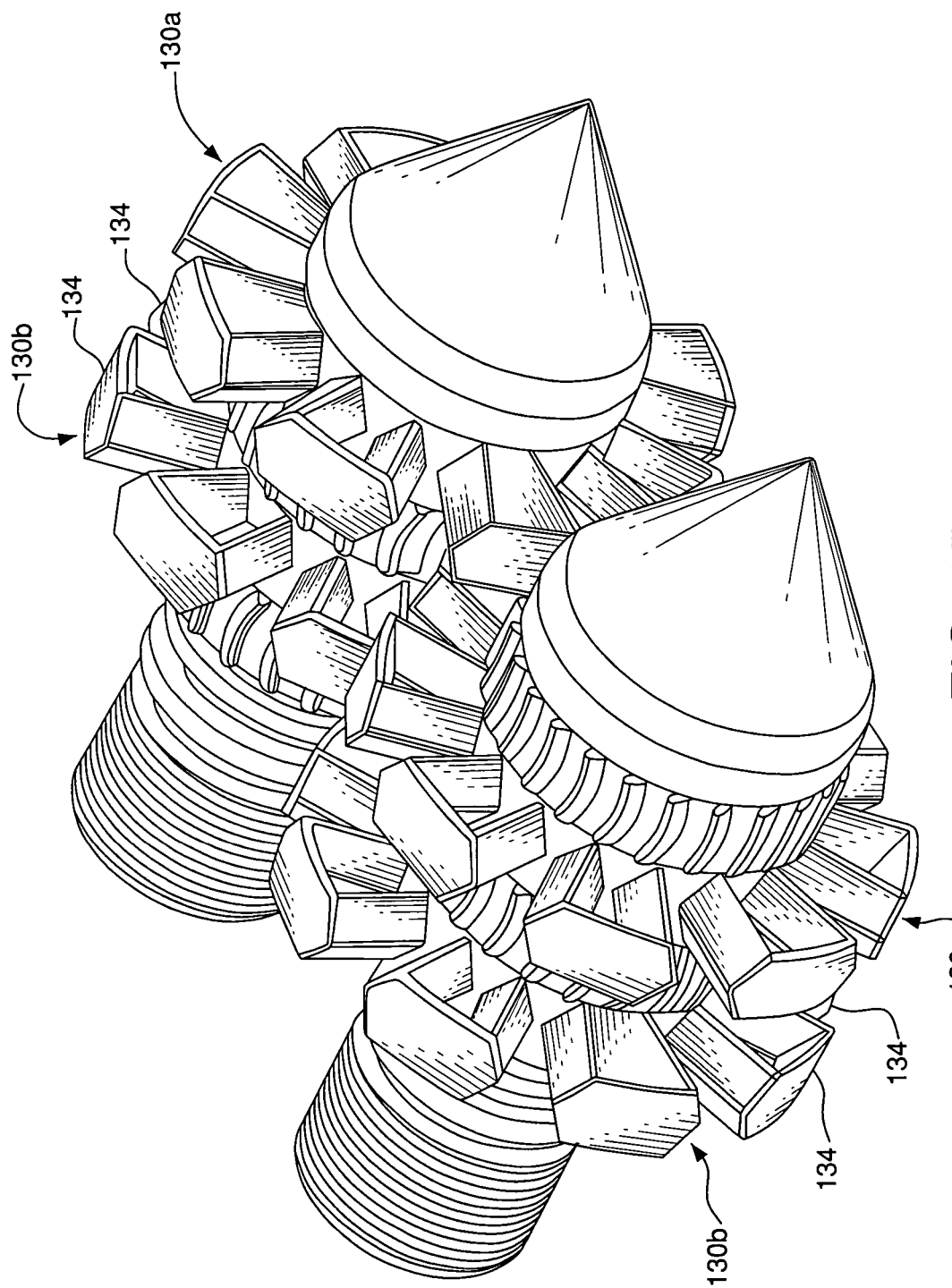
FIG. 15 is an isometric view of the screw tips of FIG. 3 shown absent the die adaptor plate.
Figure 16:
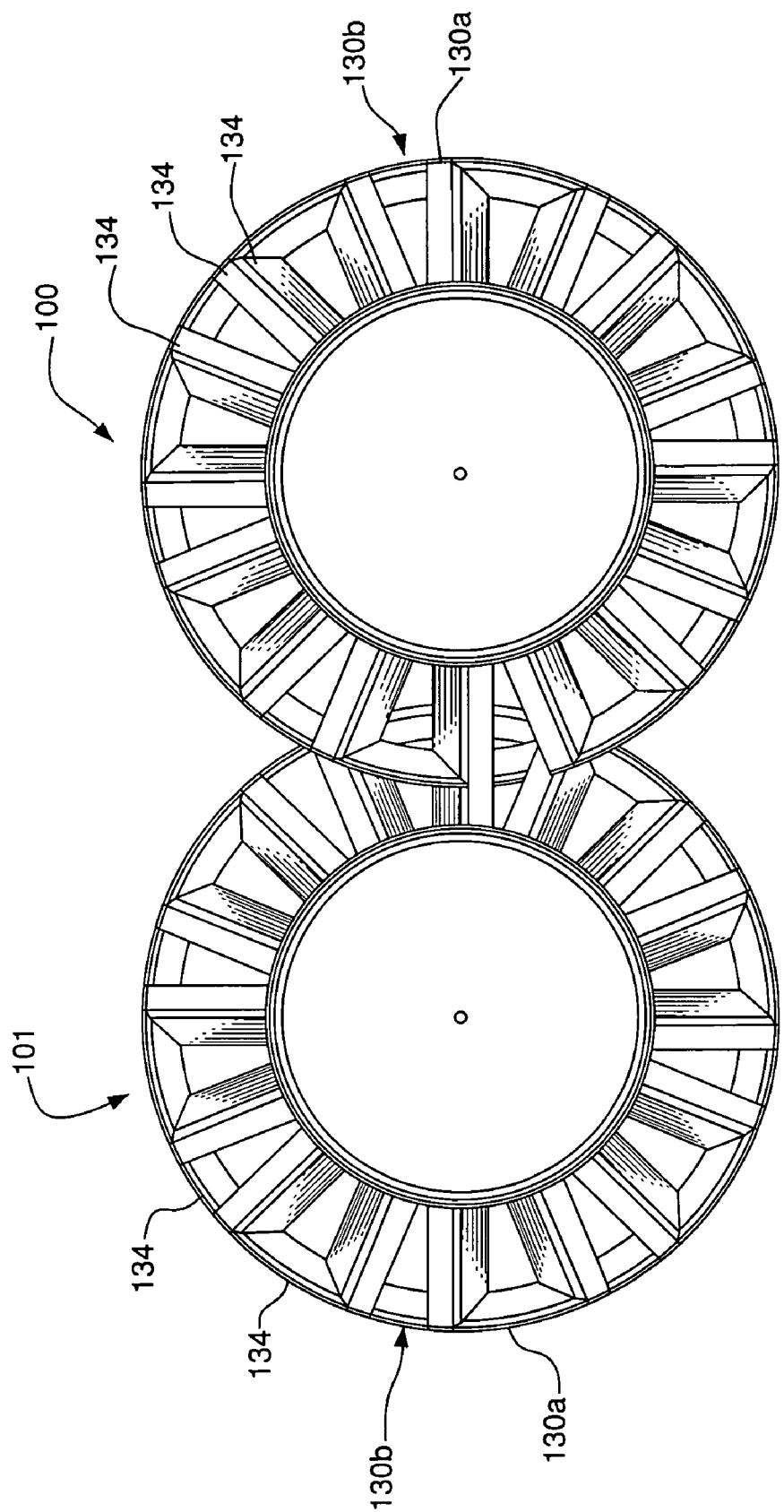
FIG. 16 is a front view of the screw tips of FIG. 15.
Figure 17:
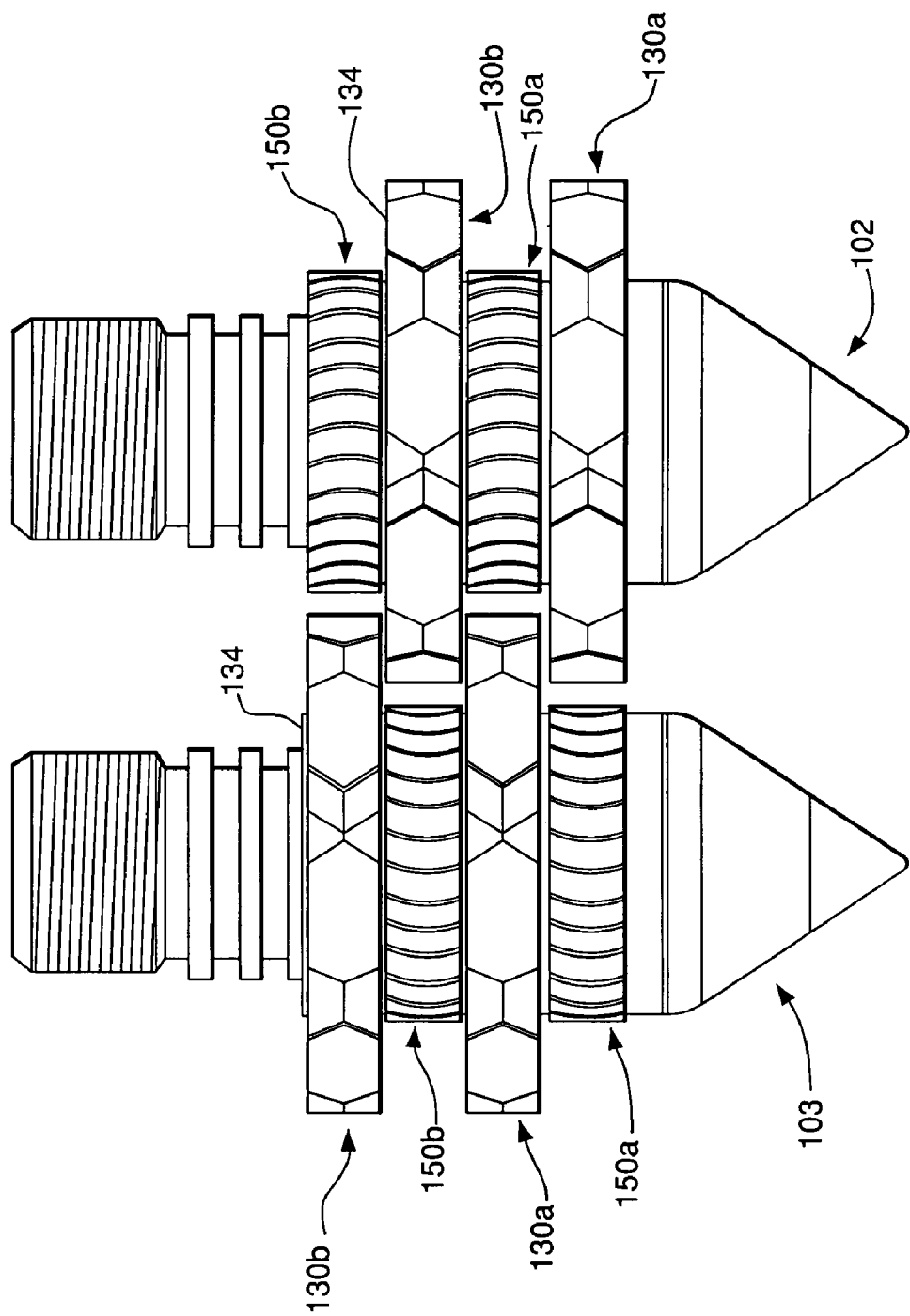
FIG. 17 is a top view of screw tips according to another exemplary embodiment of the invention.
Figure 18:
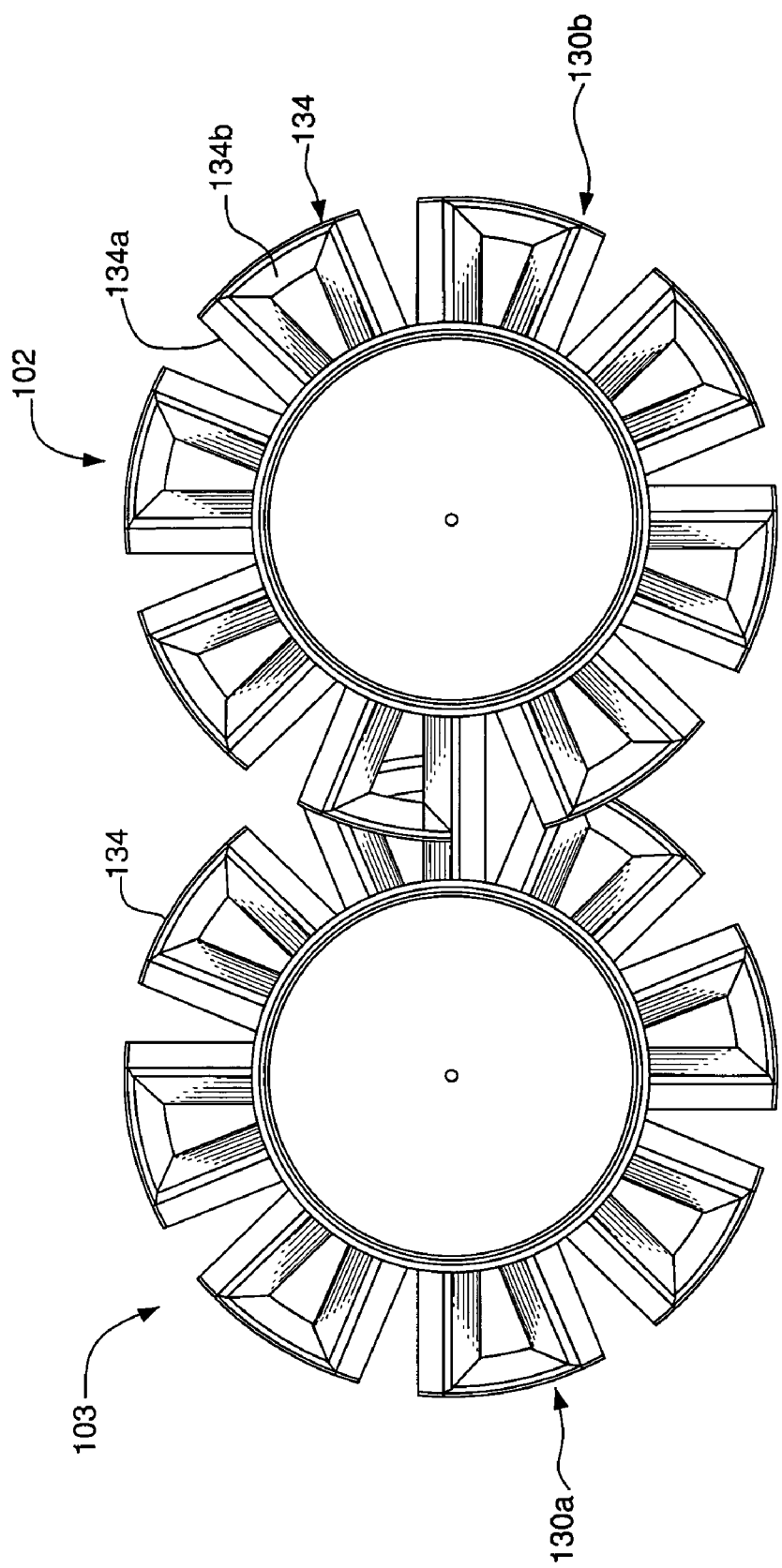
FIG. 18 is a front view of the screw tips of FIG. 17.
Figure 19:
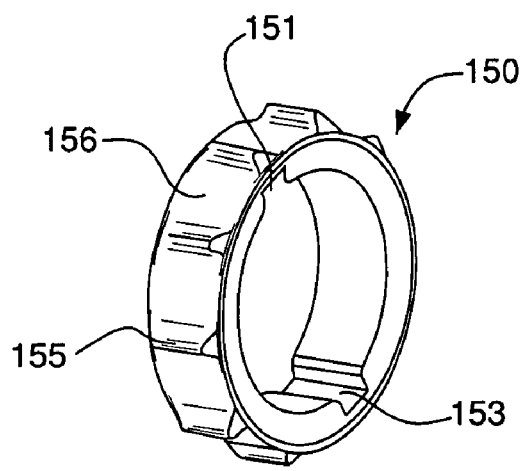
FIG. 19 is an isometric view of a separation ring of the screw tips of FIG. 2.
Figure 20:
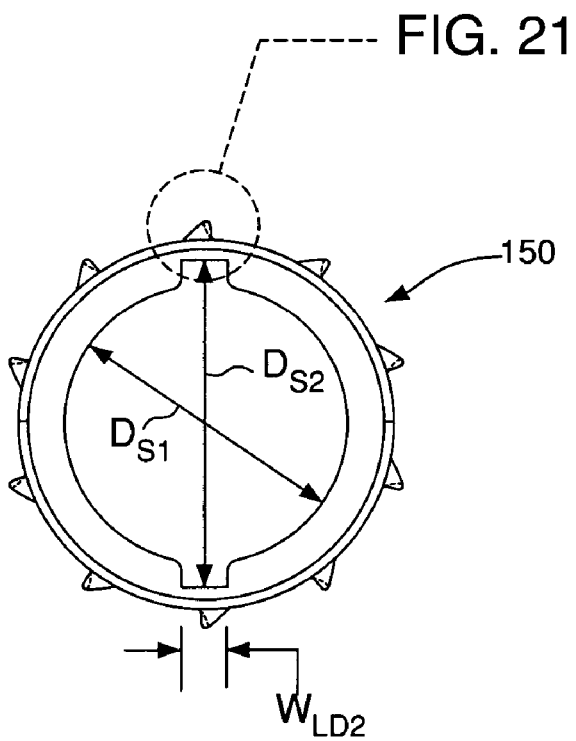
FIG. 20 is a front view of the separation ring of FIG. 19.
Figure 21:
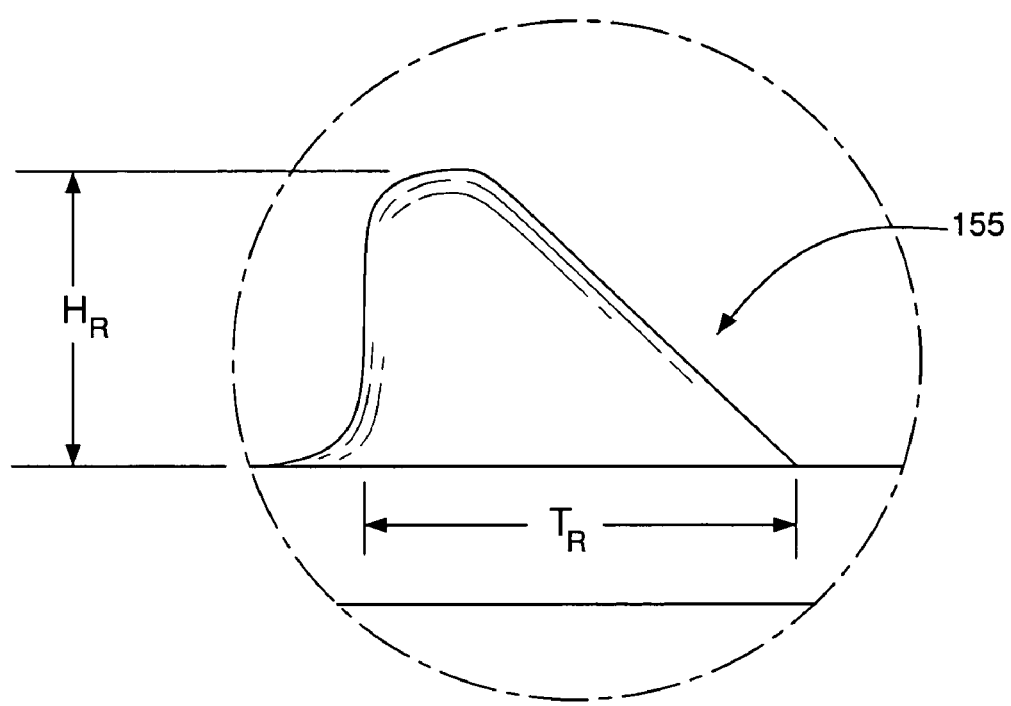
FIG. 21 is an enlarged detail of FIG. 20.
Figure 22:
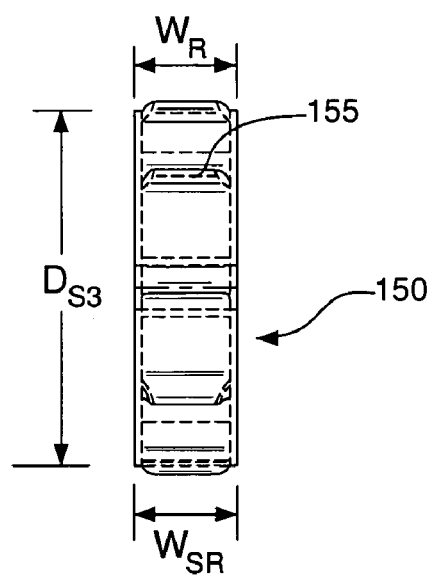
FIG. 22 is a side elevation view of the separation ring of FIG. 19.

Referring to FIGS. 15-16, the mixing elements 134 of mixing ring 130a of screw tips 100, 101 are offset from the mixing elements 134 of mixing ring 130b along an axis running parallel to the length of the screw tip. Referring to FIGS. 17-18, in an alternative embodiment, the two mixing element rings 130a, 130b of screw tips 102, 103 are situated on the shaft portion 110 so that the mixing elements 134 of each ring 130a, 130b are substantially aligned with one another along an axis running parallel to the length of the screw tip 102, 103. In FIG. 18, each mixing element 134 has radial portions 134a and a tangential portion 134b.

Figure 31:
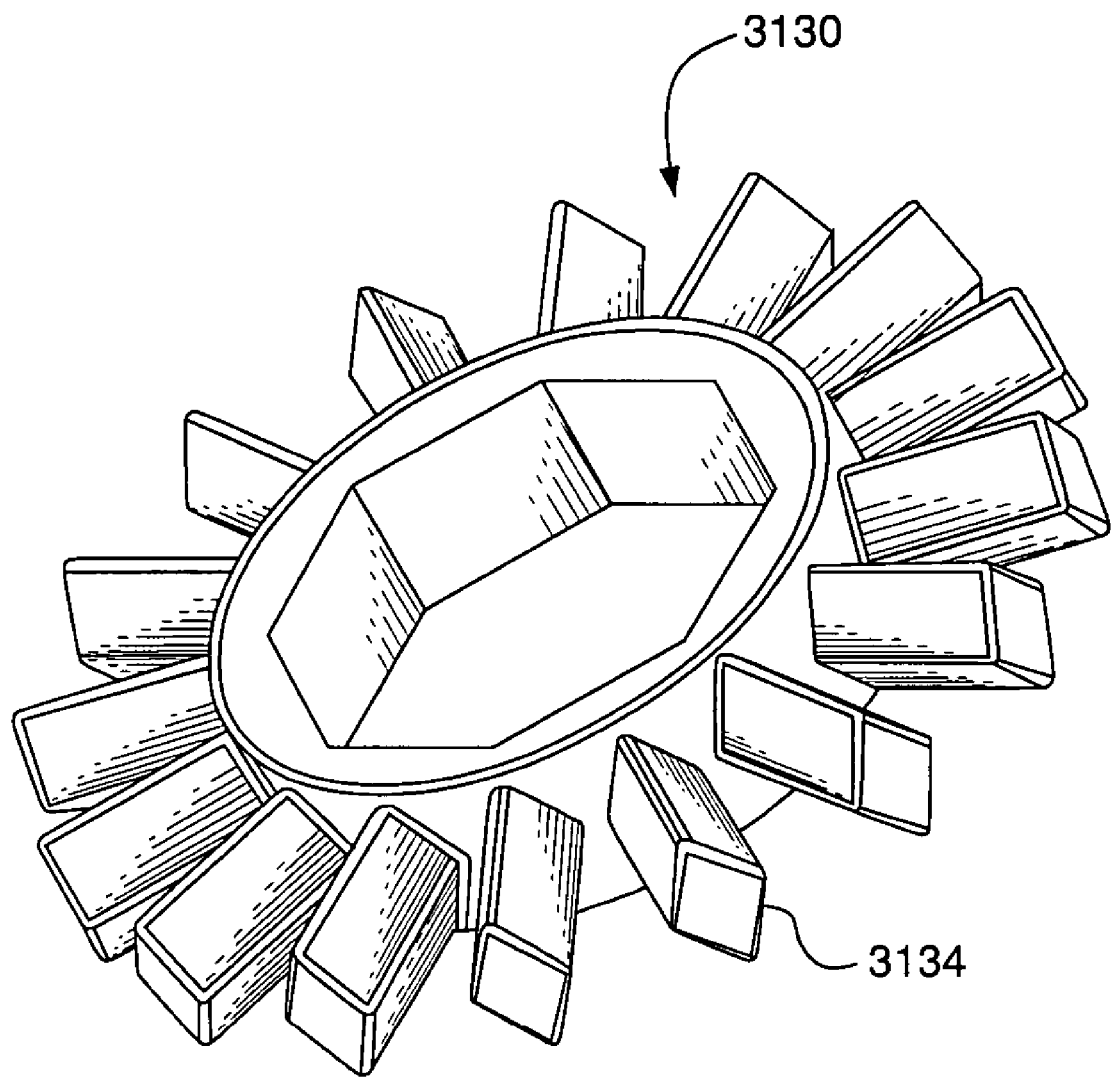
FIG. 31 is an isometric view of an alternative screw tip design.

FIG. 31 shows another example of a mixing element ring 3130, in which the mixing elements 3134 are configured as radial portions (similar to radial portions 134a in FIG. 18, without tangential portions 134b). The mixing element ring 3130 of FIG. 31 may improve material flow and eliminate stagnation points in the sharp corners of the mixing elements. This can help to prevent material (e.g., PVC) from remaining in the extruder for an excessive amount of time, thereby preventing degradation of the material.

Referring to FIGS. 19-22, one or more separation rings 150a, 150b separate the mixing element rings 130a, 130b. The separation rings 150a, 150b include locking depressions 151, 153, which are sized and shaped to snugly receive a locking key 160a, 160b. Preferably the locking depressions 151, 153 are situated 180 degrees from one another, which corresponds to the two locking recesses 112 on the shaft portion 110. The separation rings 150a, 150b, as will be more fully described below, preferably have a smaller outer diameter than the mixing element rings, which allows the mixing elements of the mixing element rings to overlap in twin screw extruders, as shown in FIGS. 15-18, and thus enhance the mixing of the thermoplastic material. Although the separation rings may be smooth along an outer surface 156, preferably they include at least one blending element, such as ribs 155, to aid in the distributive and/or dispersive mixing of the thermoplastic material. In one preferred embodiment, the separation rings 150a, 150b have ten ribs 155 aligned around the circumference of the separation rings 150a, 150b (as shown), but alternatively may have more or less than ten ribs.

In assembling the screw tip 100, 101, 102, 103 the locking keys 160a, 160b are placed into respective locking recesses 112 on the shaft portion 110. Subsequently, a desired number of mixing element rings 130a, 130b and/or separation rings 150a, 150b are slid onto the shaft portion 110 with the locking depressions 135, 137, 151, 153 aligned with the locking keys 160a, 160b. The locking keys 160a, 160b prohibit the mixing element rings 130a, 130b and/or separation rings 150a, 150b from spinning or sliding on the shaft portion 110. Once the rings have been placed on the shaft portion, the screw tip 100, 101, 102, 103 may be attached to the extruder screw (not shown), whereby the rings 130a, 130b, 150a, 150b will be caused to be pressed against one another and held tight together by friction.

Referring again to FIGS. 2 and 15-18, two exemplary screw tips 100, 101 or 102, 103 are shown as would be employed in an exemplary twin screw extruder. In these embodiments, each screw tip 100, 101, 102, 103 includes two mixing element rings 130a, 130b and two separation rings 150a, 150b. For screw tips 100 and 102 mixing element rings 130a, 130b are the first and third rings placed on the screw tip, and separation rings 150a, 150b are the second and fourth rings placed on the screw tips. For screw tips 101 and 103 mixing element rings 130a, 130b are the second and fourth rings place on the screw tip, and separation rings 150a, 150b are the first and third rings placed on the screw tip. When placed in side-by-side position, the mixing element rings of one screw tip are adjacent to the separation rings of the other screw tip. Preferably, the mixing elements 134 of the mixing element rings 130a, 130b of the two screw tips 100, 101 and 102, 103 overlap one another, as is permitted by the smaller outer diameter of the separation rings 150a, 150b. Although shown having four total rings per screw tip, the screw tips 100, 101, 102, 103 may have any number of mixing element rings and separation rings. The total length $L_{ST}$ of the screw tips 100, 101 may be varied depending on the number of rings, or, alternatively, the length $L_{ST}$ of the screw tips may remain constant and the shaft portion 110 either filled or unfilled with rings. The screw tips 100, 101 and 102, 103 may be co-rotating or counter-rotating.

Figure 5:
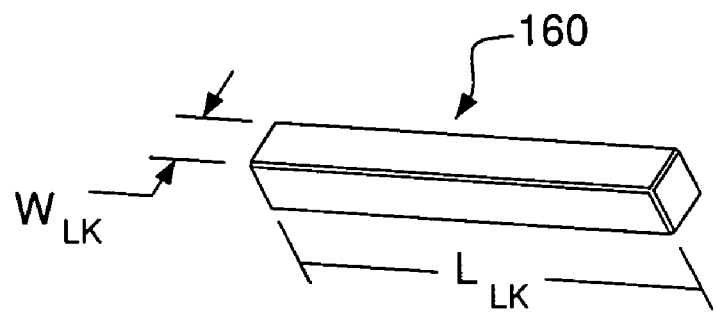
FIG. 5 is an isometric view of the locking key of the screw tips of FIG. 2.
Figure 6:
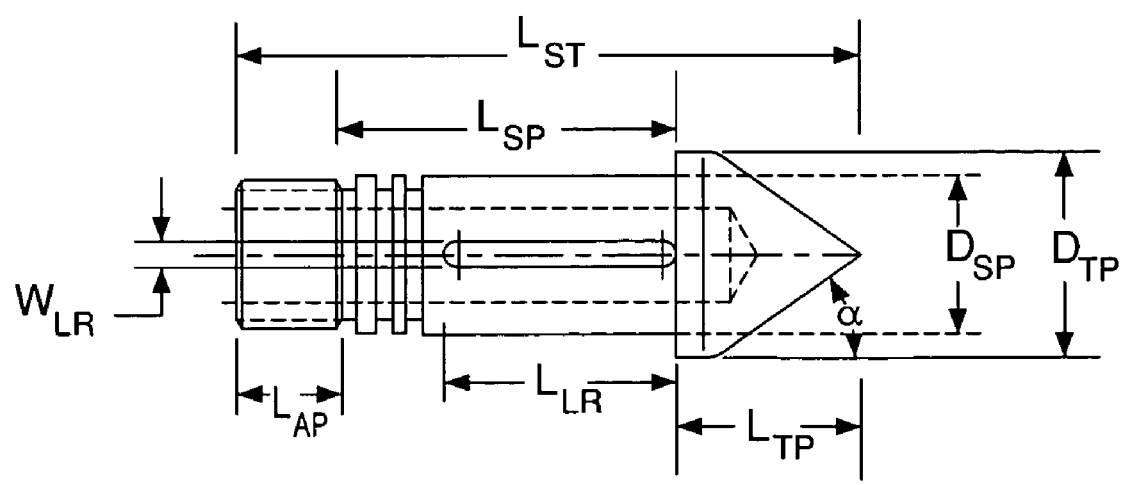
FIG. 6 is a side elevational view of the elongated portion of the screw tips of FIG. 2.
Figure 7:
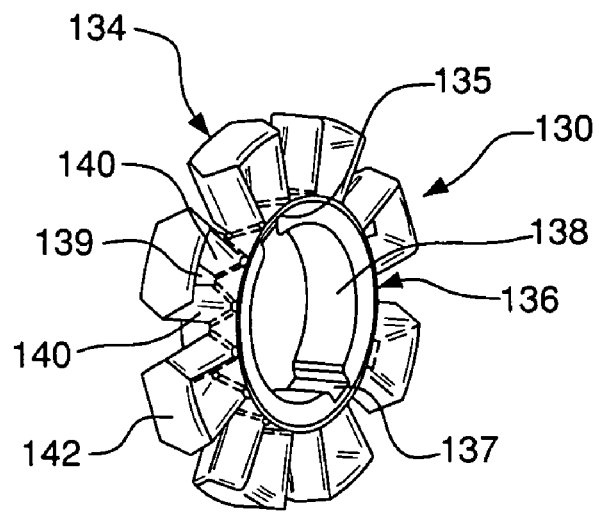
FIG. 7 is an isometric view of a mixing element ring of the screw tips of FIG. 2.
Figure 8:
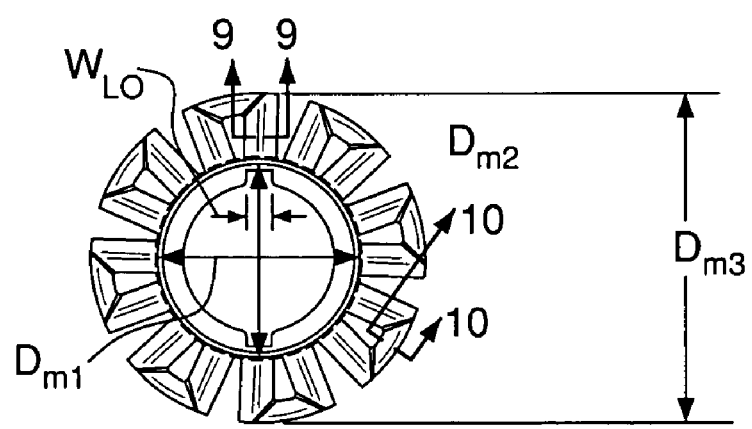
FIG. 8 is a front view of the mixing element ring of FIG. 7.
Figure 9:
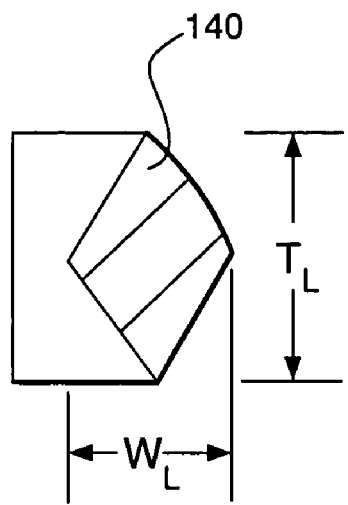
FIG. 9 is a cross-section view taken along line 9-9 of FIG. 8.
Figure 10:
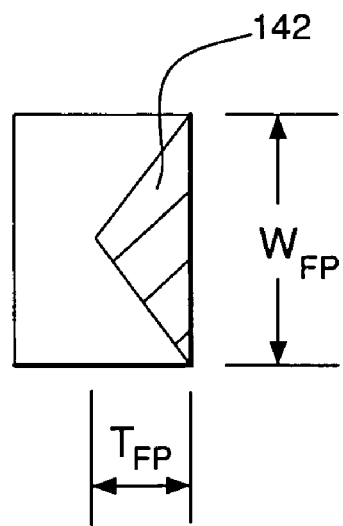
FIG. 10 is a cross-section view taken along line 10-10 of FIG. 8.
Figure 11:
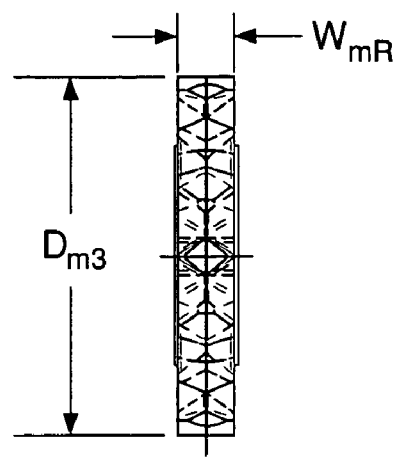
FIG. 11 is a side elevational view of the mixing element ring of FIG. 7.

The size dimensions of the screw tips 100, 101, 102, 103 and the elements of the screw tips may differ depending on variables such as type and size of the extruder and its corresponding extruder screws. Referring to FIG. 6, in one preferred embodiment the length $L_{ST}$ of the screw tip is approximately 6 inches. In this embodiment, the locking recesses 112 preferably have a length $L_{LR}$ of about 2.2 inches, a width $W_{LR}$ of about 0.25 inch and a depth of about 0.125 inch. Referring to FIG. 5, the locking keys, which preferably have a square-shaped cross-section, preferably have a length $L_{LK}$ of approximately 1.97 inches, and sides with a width $W_{LK}$ of approximately 0.25 inch. Preferably, the shaft portion 110 has a diameter $D_{SP}$ of about 1.5 inches and a length $L_{SP}$ of about 3.0 inches. Preferably the attachment portion is about 1.0 inch in length $L_{AP}$ and the tip portion is about 1.8 inches in length $L_{TP}$. The diameter DTP of the tip portion at its widest point is preferably about 2.0 inches. The angle α of the tip portion is preferably about 35°. Preferably the exterior surface of the tip portion is plated with chromium at a thickness of about 0.001 to 0.002 inch.

Referring to FIGS. 8-11, where the shaft portion 110 and locking keys 160a, 160b have the dimensions described above, preferably the mixing element rings 130a, 130b have a cylindrical ring with an inside diameter $D_{M1}$ of about 1.5 inches and an inside diameter $D_{M2}$ at the area of the locking depressions 135, 137 of about 1.75 inches. Preferably the outside diameter $D_{M3}$ is about 3.3 inches. The width $W_{LD}$ of the locking depression is preferably about 0.25 inch and the depth is preferably about 0.125 inch. The width $W_{MR}$ of the mixing element rings 130a, 130b is preferably about 0.56 inch. The mixing elements 134 of the embodiment shown in FIGS. 7-11 preferably have legs 140 with a width $W_L$ of about 0.31 inch and a thickness $T_L$ of about 0.5 inch (se FIG. 9). The flat top portion 142 preferably has a width $W_{FP}$ of about 0.5 inch and a thickness $T_{FP}$ of about 0.19 inch (see FIG. 10). In an alternative embodiment of a mixing element ring 131 as shown in FIGS. 12-14, wherein the top portion 143 of the mixing element 135 has a diamond-shaped cross-section with rounded edges 141 as opposed to the triangular cross-section of the flat top portion 142 of mixing element ring 130a, 130b, preferably the thickness $T_{TP}$ of the top portion 143 is about 0.31 inch (see FIG. 14), with the remainder of the dimensions of mixing element ring 146 being similar to that of mixing element rings 130a, 130b. Preferably the exterior surface of the mixing element rings 130a, 130b, 131 is plated with chromium at a thickness of about 0.001 to 0.002 inch.

Referring again to FIGS. 19-22, where the shaft portion 110 and locking keys 160a, 160b have the dimensions described above, preferably the separation rings 150a, 150b have an inside diameter $D_{S1}$ of about 1.5 inches and an inside diameter $D_{S2}$ at the area of the locking depressions 151, 153 of about 1.75 inches. Preferably the outside diameter $D_{S3}$ (not including the ribs) is about 1.97 inches. The width $W_{LD2}$ of the locking depression is preferably about 0.25 inch and the depth is preferably about 0.125 inch. The width $W_{SR}$ of the separation rings 150a, 150b is preferably about 0.56 inch. The ribs 155 preferably have a height $H_R$ of about 0.10 inch, a thickness $T_R$ of about 0.16 inch and a width $W_R$ of about 0.50 inch.

In an alternative embodiment, as opposed to having separate rings which are removable form the shaft portion of the screw tip as described with respect to screw tips 100, 101, 102, 103, the screw tip may include mixing and/or blending elements which are integral with the shaft portion, and thus are permanently attached to the screw tip. In such embodiment, as with the screw tips described above, the mixing elements and ribs may have differing structures, and the mixing element rings and separation rings may have varying alignment patterns and numbers.

Figure 25:
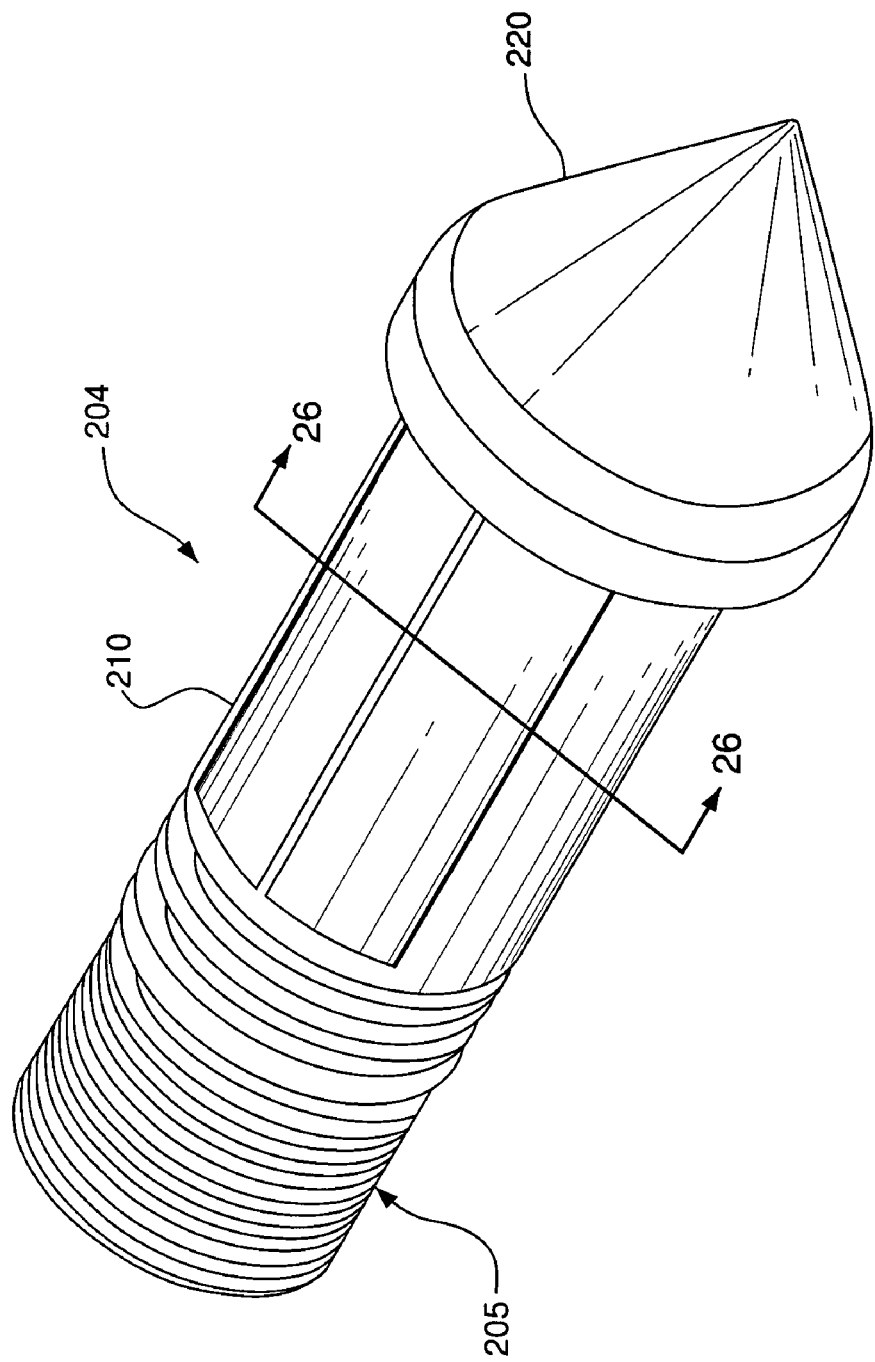
FIG. 25 is a isometric view of an elongated portion of the screw tips of FIG. 23.

Referring now to FIGS. 23-30, another exemplary embodiment of screw tips 200, 201 for a twin screw extruder are shown comprising an elongated portion 204, two mixing element rings 230a, 230b, and two separation rings 250a, 250b. The elongated portion 204 includes an attachment portion 205, a shaft portion 210, and a conical tip portion 220. Referring to FIG. 25, the attachment portion 205 preferably includes threads 206 for allowing coaxial attachment to a complimentary reverse-threaded screw (not shown). Alternatively, the screw tip may be integral with a screw and therefore lack an attachment portion. Although shown as would be employed in a twin screw extruder, a single screw tip 200 or 201 may be employed in extruders having a single screw. In addition, more than two screws, and thus screw tips, could be employed without departing from the scope of the invention.

Figure 26:
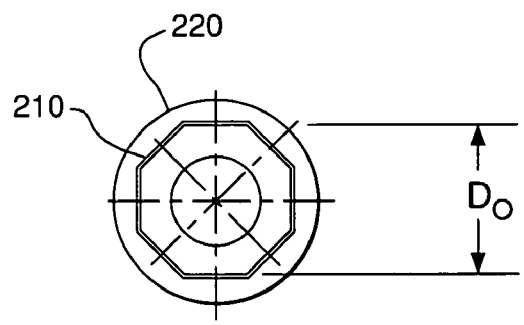
FIG. 26 is a cross-section view of the elongated portion of FIG. 25.

As shown best in FIG. 26, preferably the shaft portion 210 has a cross-section that is substantially octagon-shaped. Alternatively, the shaft portion may have a cross-section with the shape of a triangle, square, pentagon, hexagon, heptagon, or any other multisided shape. The shaft portion 210, upon which the rings 230a, 230b, 250a, 250b are concentrically situated, may vary in length, the length increasing with an increase in the number of rings employed on the screw tip 200, 201.

The tip portion 220 is preferably conical. The angle θ of the tip portion preferably corresponds to the angle of the inside surface of the adaptor of the extruder. The tip portion 220 preferably includes shaft attachment means, such as threads (now shown), for attachment and separation from the shaft portion 210. Alternatively, the tip portion 220 and the shaft portion 210 may be formed from a single piece of material.

Figure 27:
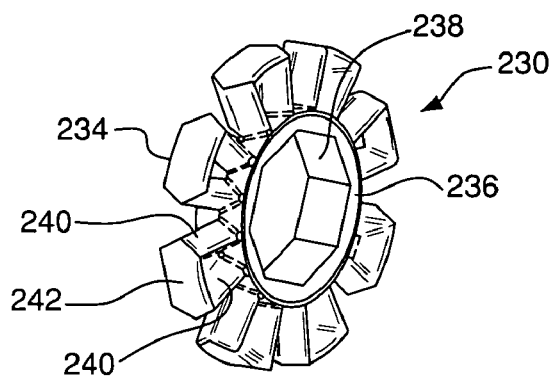
FIG. 27 is an isometric view of a mixing element ring of the screw tips of FIG. 23.
Figure 28:
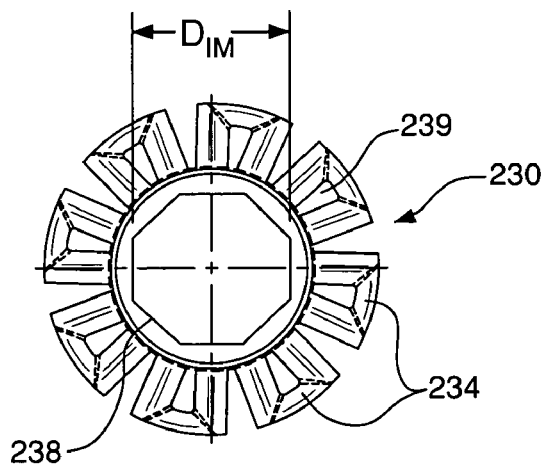
FIG. 28 is a front view of the mixing element ring of FIG. 27.

Referring to FIGS. 27-28, the mixing element rings 230a, 230b include at least one mixing element 234 and cylindrical ring 236. Preferably, an inside surface 238 of the cylindrical ring 236 is shaped to substantially correspond to the shape of the cross section of the shaft portion 210 (octagon shape shown in the embodiment of FIGS. 23-30). Preferably the ring 236 is sized to snugly fit onto the shaft portion 210. The mixing element rings 230a, 230b preferably include a plurality of mixing elements 234, which are preferably aligned with one another around a circumference of the cylindrical ring 236. Also, preferably, the mixing elements 234 include an aperture 239. In the exemplary embodiment shown in FIGS. 27-28, the mixing elements comprise two legs 240, which may be diamond-shaped, as shown, and a flat top portion 242, which is attached to the two legs 240. Alternatively, the top portion of the mixing element may be triangularly shaped rather than flat as shown in FIGS. 12-14. Other configurations or designs of the mixing elements may also be employed without departing from the scope of the invention.

Figure 23:
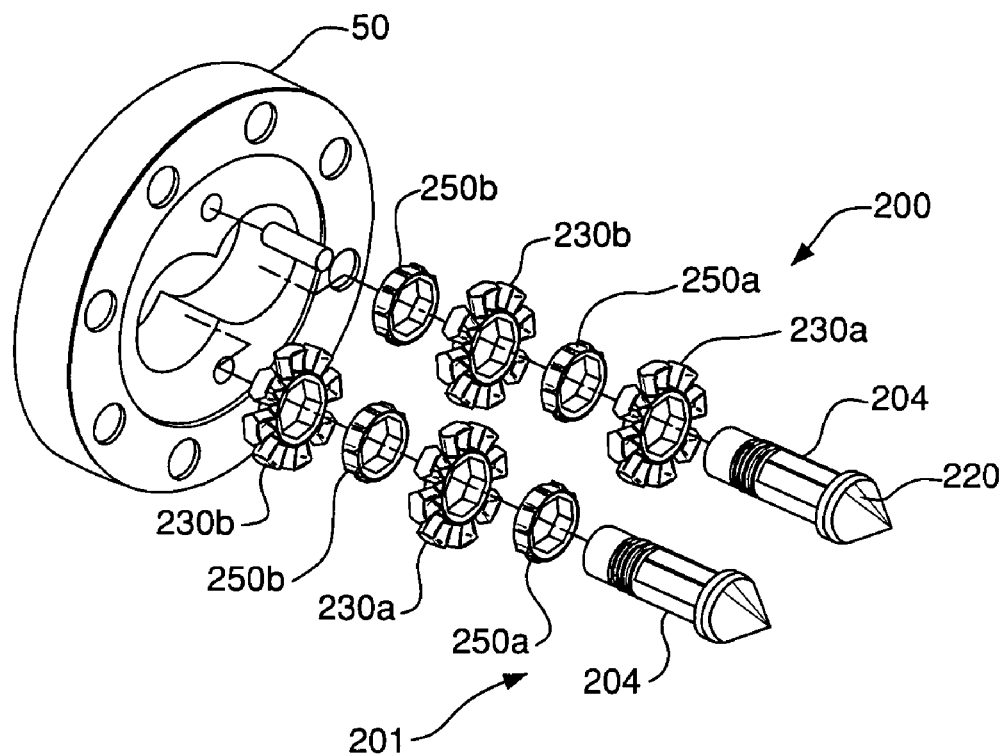
FIG. 23 is a an exploded view of extruder screw tips in accordance with another exemplary embodiment of the invention shown in conjunction with a die adaptor plate.
Figure 24:
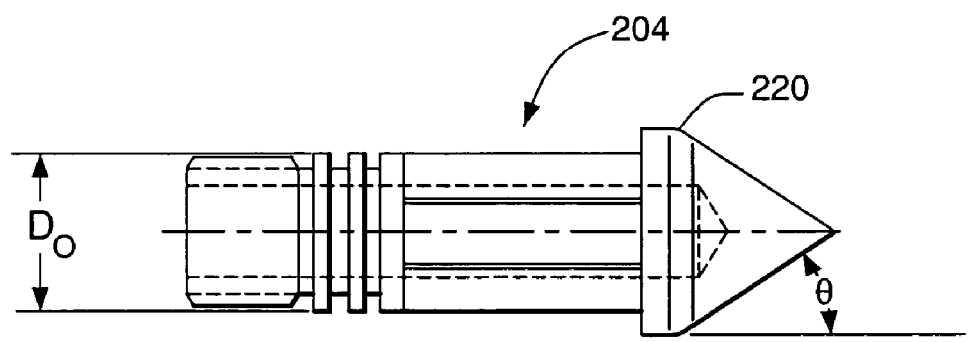
FIG. 24 is a side elevational view of the elongated portion of the screw tips of FIG. 23.

Although shown in FIG. 23 comprising two mixing element rings 230a, 230b, the screw tip 200, 201 may have one mixing element ring or more than two mixing element rings. The shaft portion 210 can be modified in length to accommodate any number of rings (mixing element rings and/or separation rings).

As shown in FIG. 23, the two mixing element rings 230a, 230b of screw tips 200, 201 may situated on the shaft portion 210 so that the mixing elements 234 of each ring 230a, 230b are substantially aligned with one another along an axis running parallel to the length of the screw tip 200, 201. Alternatively, the mixing elements 234 of mixing ring 230a of the screw tips may be offset from the mixing elements 234 of mixing ring 230b along an axis running parallel to the length of the screw tips.

Figure 29:
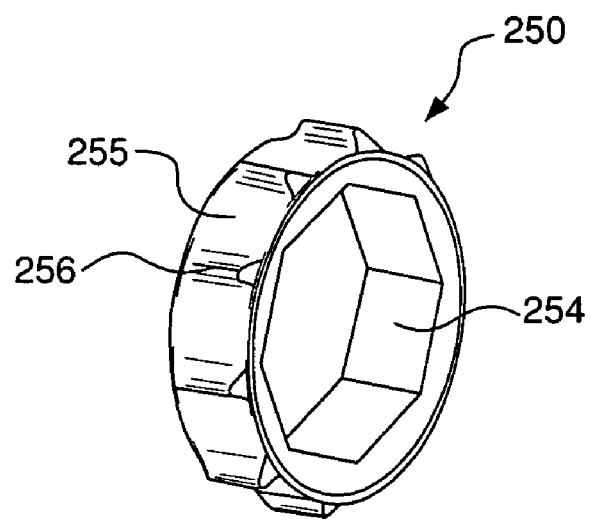
FIG. 29 is an isometric view of a separation ring of the screw tips of FIG. 23.
Figure 30:
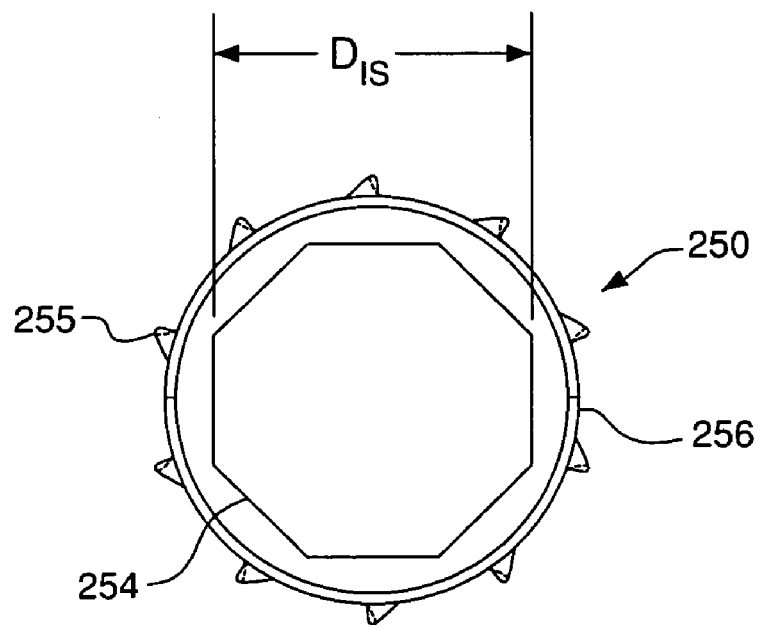
FIG. 30 is a front view of the separation ring of FIG. 29.

Referring to FIGS. 29-30, one or more separation rings 250a, 250b separate the mixing element rings 230a, 230b. The separation rings 250a, 250b have an inside surface 254 which is shaped to substantially correspond to the shape of the cross section of the shaft portion 210 (octagon shape shown in the embodiment of FIGS. 23-30). Preferably the separation rings are sized to snugly fit onto the shaft portion 210. As described with respect to screw tips 100, 101, 102, and 103, the separation rings 150a, 150b, of screw tips 200, 201 preferably have a smaller outer diameter than the mixing element rings, which allows the mixing elements of the mixing element rings to overlap in twin screw extruders. Although the separation rings 250a, 250b may be smooth along an outer surface 256, preferably they include at least one blending element, such as ribs 255, to aid in the distributive and/or dispersive mixing of the thermoplastic material.

In a preferred embodiment, the size dimensions of the screw tips 200, 201, including the mixing element rings 230a, 230b and the separation rings 250a, 250b, are similar to those described above with respect to screw tips 100, 101, 102, and 103, except with respect to the octagon-shaped shaft portion 210, and the octagon-shaped inner surfaces of the mixing element rings 230a, 230b and separation rings 250a, 250b. The outside diameter $D_O$ of the shaft portion 210 is preferably about 1.5 inches. The inside diameter $D_{IM}$ of the mixing element rings 230a, 230b and the inside diameter $D_{IS}$ of the separation rings 250a, 250b is preferably about 1.5 inches.

According to another exemplary embodiment, an extrusion process for extruding molten polymeric material comprises providing a screw tip having a plurality of mixing elements and rotating the screw tip. Each mixing element includes an aperture therein, and the molten polymeric material is fed through the apertures of the mixing elements when the screw tip is rotated. In a preferred embodiment of this process, the molten thermoplastic material is mixed by two adjacent screw tips. The screw tips may be co-rotating or counter-rotating. The presence of the mixing elements at the screw tip, either at or near an adaptor region may facilitate a reduction in head pressure that might otherwise lead to burning of the thermoplastic material. It may also allow the placement of an additive, such as a color concentrate, near the end of the extruder screw, which advantageously reduces the residence time of the additive. Where the additive is a color concentrate, such reduction in residence time allows for quicker color changes.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A twin screw extruder comprising:
two adjacent screw tips connected to respective twin screws of the extruder, each screw tip comprising a shaft portion, a separation ring removably connecting the shaft portion to one of the twin screws, a mixing element ring connected to the shaft portion, and extrudate mixing elements on each mixing element ring;
the mixing element rings having the extrudate mixing elements thereon being rotatable with the two adjacent screw tips, respectively, to mix an extrudate at the end of the twin screws of the extruder; and
each of individual ones of the extrudate mixing elements having two legs connected by a top portion with an aperture between the two legs to flow at least some of the extrudate therethrough.

2. The twin screw extruder of claim 1, wherein each of the two adjacent screw tips has an outside diameter of the separation ring being smaller than the outside diameter of the mixing element ring.

3. The twin screw extruder of claim 1, wherein the mixing elements comprise a first set of mixing elements substantially aligned with one another around a circumference of the shaft portion and a second set of mixing elements substantially aligned with one another around the circumference of the shaft portion, wherein the first set of mixing elements on a first of the mixing element rings is substantially aligned with the second set of mixing elements on a second of the mixing element rings.

4. The twin screw extruder of claim 1, wherein the mixing elements comprise a first set of mixing elements substantially aligned with one another around a circumference of the shaft portion and a second set of mixing elements substantially aligned with one another around the circumference of the shaft portion, wherein the first set of mixing elements on a first of the mixing element rings is offset from the second set of mixing elements on a second of the mixing element rings.

5. The twin screw extruder of claim 1, further comprising:
each of the separation rings having an outer surface; and
extrudate blending ribs on the outer surface.

6. The twin screw extruder of claim 1, further comprising:
the two legs comprise two radial portions of the extrudate mixing elements.

7. The twin screw extruder of claim 1, wherein the two legs comprise two radial portions of the extrudate mixing elements, and the top portion comprises a tangential portion connecting the two radial portions.

8. An extruder screw tip of an extruder machine, comprising:
a mixing element ring;
extrudate mixing elements on the mixing element ring;
the mixing element ring having the extrudate mixing elements thereon being rotatable with the extruder screw tip at the end of a feedscrew of the extruder machine to mix an extrudate; and
each of individual ones of the extrudate mixing elements having two legs connected by a top portion with an aperture between the two legs to flow at least some of the extrudate therethrough.

9. The extruder screw tip of claim 8, wherein the two legs comprise radial portions.

10. The extruder screw tip of claim 8, and further comprising:
a separation ring on the extruder screw tip, the separation ring being smaller than the mixing element ring.

11. The extruder screw tip of claim 8, and further comprising:
a separation ring on the extruder screw tip, the separation ring having an outer surface; and
extrudate blending ribs on the outer surface.

12. An extruder screw tip of an extruder machine, comprising:
a mixing element ring on an extruder screw tip;
extrudate mixing elements on the mixing element ring;
the mixing element ring being rotatable with the extruder screw tip at the end of a feedscrew of the extruder machine to mix an extrudate; and
each of individual ones of the extrudate mixing elements having two radial portions on the mixing element ring connected by a tangential portion with an aperture between the two radial portions to flow at least some of the extrudate therethrough.

13. The extruder screw tip of claim 12, and further comprising:
a separation ring on the extruder screw tip, the separation ring being smaller than the mixing element ring.

14. The extruder screw tip of claim 12, and further comprising:
  a separation ring on the extruder screw tip, the separation ring having an outer surface; and
  extrudate blending ribs on the outer surface.

15. A process of mixing an extrudate in an extruder machine, comprising:
  rotating a feedscrew in the extruder machine to rotate an extruder screw tip at the end of the feedscrew;
  the extruder screw tip having a mixing element ring and multiple extrudate mixing elements on the mixing element ring, and each of individual ones of the extrudate mixing elements having two legs connected by a top portion with a corresponding aperture between the two legs to flow at least some of the extrudate therethrough; and
  rotating the mixing element ring by rotating the extruder screw tip, while flowing said at least some of the extrudate through the corresponding aperture.

* * * * *